Patented Nov. 23, 1926.

1,607,715

UNITED STATES PATENT OFFICE.

EDWARD G. ACHESON, OF NEW YORK, N. Y.

ABRASIVE IMPLEMENT.

No Drawing.   Application filed September 9, 1922. Serial No. 587,205.

In my prior Patents Nos. 722,792 and 722,793, issued March 17, 1903, I have described a refractory material which may be prepared by the reaction of carbon upon silica at elevated temperatures, and which comprises carbon, silicon and oxygen in chemical combination. This material which I have designated "siloxicon" in the said patents, possesses the peculiar and valuable property of being self-bonding; that is to say, if formed into a heavy paste with water, shaped, and dried or fired, it forms a strong coherent mass well adapted for many high temperature applications, such for example as furnace linings, crucibles, twyers, refractory bricks, muffles and the like.

The same substance is produced in large quantities but in crude and impure form in the regular operation of silicon carbide furnaces, constituting in this case a zone lying between the silicon carbide and the external unreduced mixture. It is removed from the furnace admixed with a greater or less proportion of silicon carbide, sand and coke, and as such is widely used for furnace linings and like purposes under the designation of "fire-sand" and other names.

For preparing an abrasive implement in accordance with the present invention the carbon-silicon-oxygen compound, heretofore designated siloxicon, may be isolated from the foregoing or other crude mixtures containing the same, and recovered in a degree of purity which has not, I believe, been attained heretofore. In such pure state it has been found to possess marked abrasive qualities, although differing greatly from silicon carbide in respect to hardness, temper and the like, and also in that it is believed to be non-crystalline (amorphous). In the pure form and minute subdivision in which it is prepared by my process, it may be used for fine polishing operations, as those for which jewelers' rouge is now employed. Or bonded into abrasive stones or other implements, or applied to a leather or fabric backing, it is suitable for razor strops etc. It is well adapted for the manufacture of crucibles, as already noted, and I have found it possible to plunge such thin-walled crucibles, at the temperature of firing, directly into water without cracking or other injury. It is believed to be applicable also for such purposes as phonograph record compositions, in which fineness and uniformity of texture in conjunction with a certain abrasive quality are requisite.

In carrying out my process in its preferred form, the crude or impure siloxicon from the silicide of carbon furnaces or other source is first crushed to a fine powder, which may then be treated by floating or subsidence to effect a first rough separation of the coarser particles, consisting mostly of silicon carbide, sand and sometimes coke. The finer portion, comprising practically all of the siloxicon, admixed with crystalline carbide and silica is then subjected to the operation known in this art as "deflocculation", such procedure involving, as is now well understood by those skilled in this art, the mechanical working of the material in paste form in conjunction with certain organic bodies such as tannin, extracts from roasted cereals or other starchy materials, etc., known as deflocculating agents. This operation is facilitated by the addition of ammonia or amino-bodies such as hexamethylenetetramine.

The effect of this treatment is to bring about a further subdivision of the siloxicon particles, or some of them, whereby they pass beyond the limits of visibility under the ordinary microscope and acquire the characteristics of the so-called colloidal substances, being permanently suspensible in pure water but precipitated therefrom (flocculated) by the addition of electrolytes, even in minute proportions. No similar change occurs in the crystalline components of the mixture.

The entire mass, thinned with pure water to a creamy consistence, is now subjected to an operation having for its purpose the separation by subsidence of the finer from the coarser particles. This may be accomplished by sedimentation in a series of tanks, or by any appropriate classifying system; but I prefer to use a thickener of the Dorr type, which yields as an effluent a suspension containing the whole of the deflocculated particles, together with such fine but non-deflocculated particles as may remain suspended under the particular conditions.

To this suspension I add a suitable electrolyte such as alum, hydrochloric acid, etc., the effect being to bring about a flocculation of the suspended particles and their precipitation in a condition readily separable from the supernatant water by subsidence or filtration. The resulting paste consists practically wholly of the siloxicon associated with a certain amount of organic matter derived from the deflocculating agent employed and perhaps with some carbon from the original furnace charge. It exhibits the characteristic self-bonding quality of siloxicon, aided perhaps by the organic matter above mentioned. It may be shaped, dried and fired, to produce crucibles, abrasive implements and other articles as mentioned above; or may be dried, with grinding if necessary, to a fine powder suitable for abrasive and other purposes.

I claim:—

An abrasive implement comprising a compound of silicon, carbon and oxygen and substantially free from crystalline carbide of silicon.

In testimony whereof, I affix my signature.

EDWARD GOODRICH ACHESON.